US005470041A

United States Patent [19]
Cucinotta

[11] Patent Number: 5,470,041
[45] Date of Patent: Nov. 28, 1995

[54] WORKSTATION FOR LAPTOP-TYPE COMPUTER

[76] Inventor: James L. Cucinotta, 2079 Centerport Rd., Mohrsville, Pa. 19541

[21] Appl. No.: 191,021

[22] Filed: Feb. 2, 1994

[51] Int. Cl.⁶ .......................... A47B 91/00; A47B 95/00
[52] U.S. Cl. ..................... 248/349; 248/346.03
[58] Field of Search ............... 211/13, 163, 131; 248/349, 346, 444, 447, 450, 451, 458, 460, 917

[56] References Cited

U.S. PATENT DOCUMENTS

| | | | |
|---|---|---|---|
| 301,345 | 7/1884 | Dupin et al. | 248/458 |
| 476,807 | 6/1892 | Mortimer | 248/458 |
| 664,031 | 12/1900 | Albright | 248/458 |
| 673,026 | 4/1901 | Moyes | 248/458 |
| 779,050 | 1/1905 | Marvin | 248/458 |
| 936,281 | 10/1909 | Woolsey | 248/458 |
| 3,396,932 | 8/1968 | Slaga | 248/349 |
| 3,479,632 | 11/1969 | Galles | 248/349 |
| 3,936,026 | 2/1976 | Hampel et al. | 248/349 |
| 4,547,027 | 10/1985 | Scheibenreif | 248/349 |
| 4,637,322 | 1/1987 | Hampshire et al. | 108/102 |
| 4,648,574 | 3/1987 | Granlund | 248/349 |
| 4,765,583 | 8/1988 | Tenner | 248/444 |
| 4,852,498 | 8/1989 | Judd | 108/43 |
| 4,946,120 | 8/1990 | Hatcher | 248/349 |
| 5,024,415 | 6/1991 | Purens | 248/349 |
| 5,041,770 | 8/1991 | Seiler et al. | 318/265 |
| 5,120,117 | 6/1992 | Williams | 312/208 |
| 5,161,760 | 11/1992 | Terbrack | 248/118 |
| 5,174,223 | 12/1992 | Nagy et al. | 108/50 |

Primary Examiner—Blair M. Johnson
Assistant Examiner—Catherine S. Collins
Attorney, Agent, or Firm—Charles A. Wilkinson

[57] ABSTRACT

A two section plastic resin computer stand for support at a convenient angle of a laptop computer in a permanent office or residential environment is provided with an upper section and a lower section which are rotatable with respect to each other within a certain range to increase the convenience.

17 Claims, 9 Drawing Sheets

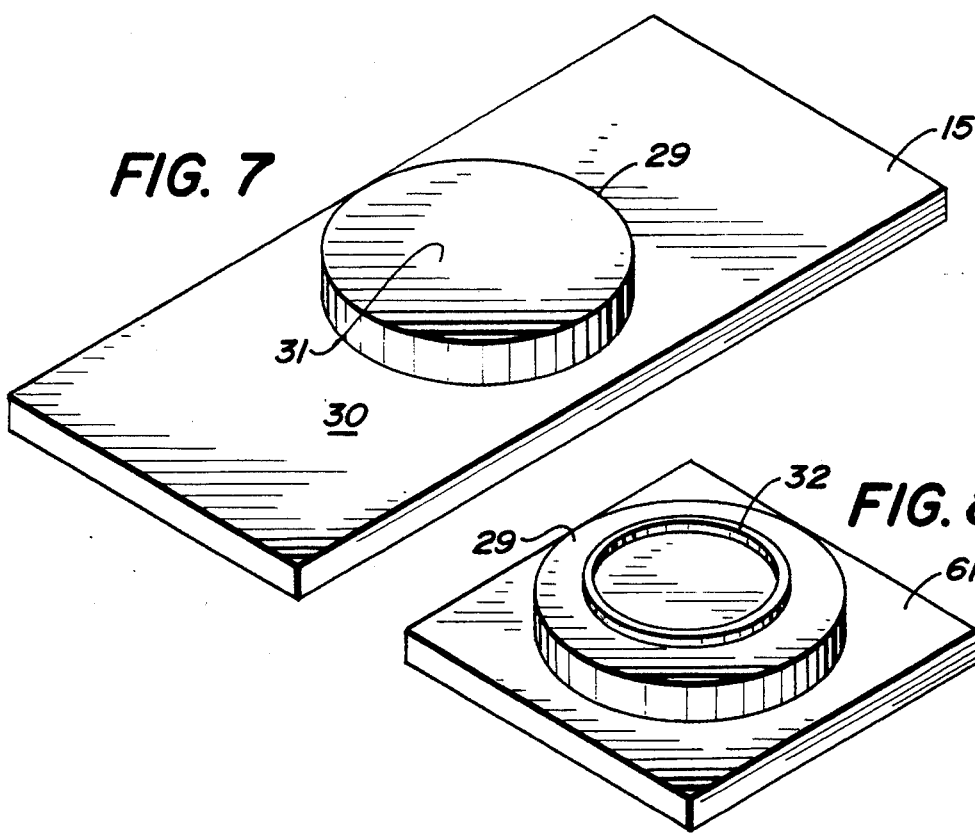

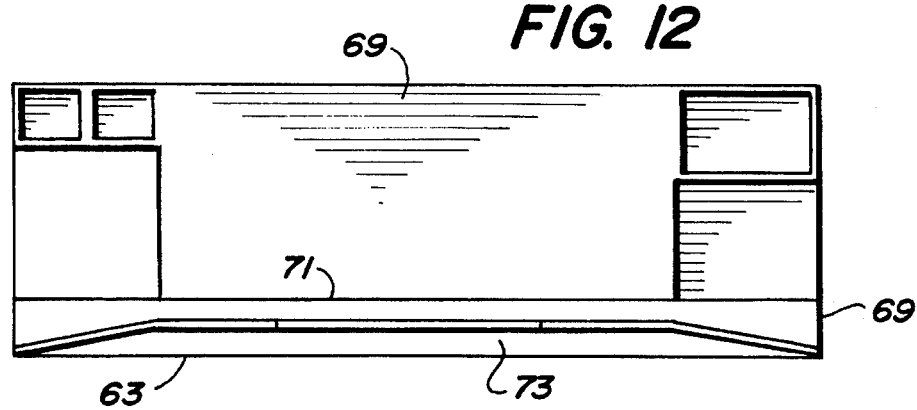
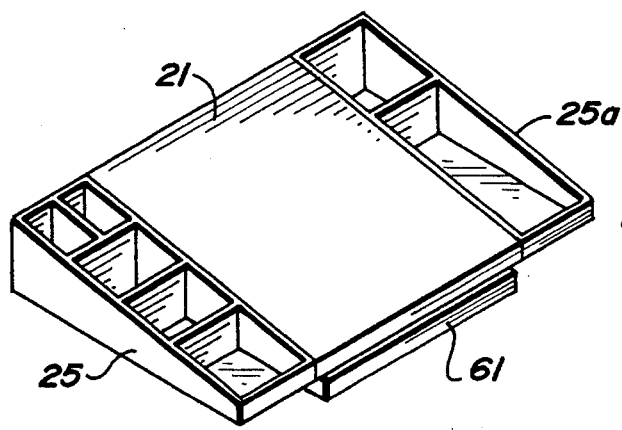
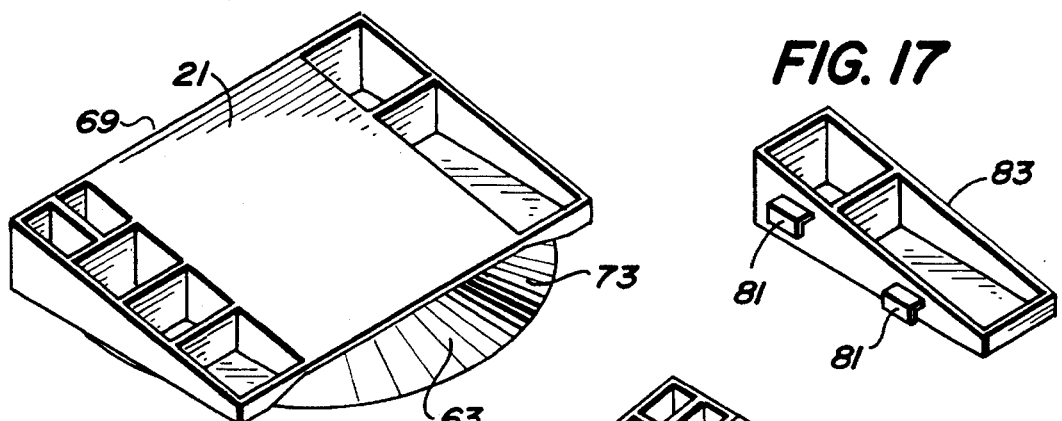
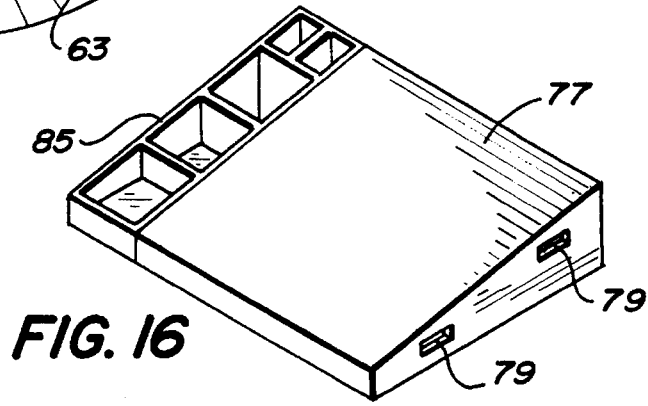

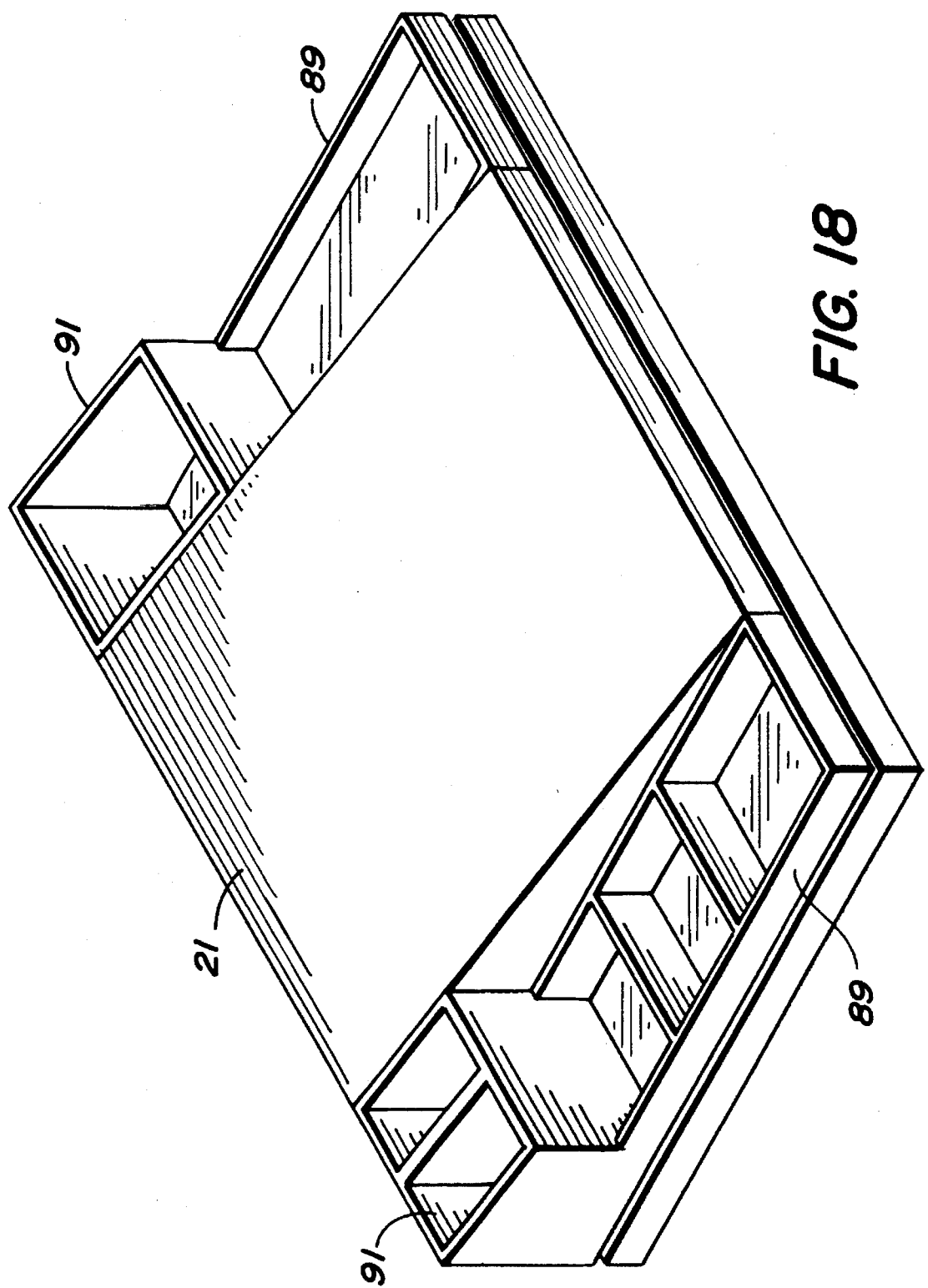

WORKSTATION FOR LAPTOP-TYPE COMPUTER

RELATED APPLICATIONS

This application is related to a simultaneously filed design application directed to one of the embodiments disclosed herein.

Background of the Invention

1. Field of the Invention

This invention relates to workstations for computers, and more particularly to a workstation for a laptop computer. More particularly still, this invention relates to a support to hold a laptop computer on a desk or table in a home or office to make such laptop-type computer convenient to use, not only when traveling, but for home or office use when not traveling.

2. Discussion of the Prior Art

A large number of computer workstations have been developed in recent years, most of which are for stationary computers. However, with the miniaturization of computers, the so-called laptop computer has become more and more popular and in fact, almost ubiquitous, being used not only by traveling business people such as executives and sales personnel, but also by engineers, students, accountants, teachers, housewives, lawyers and other professional and business people. Laptop computers are typically small, compact, portable and usually battery-operated computers which can also be plugged into an ordinary 120 volt A.C. power line, both for operation of the computer and recharging the portable computer batteries. Typically, the laptop computer will be contained in a small case resembling rather closely a small folding briefcase with the keyboard and processing unit in the lower portion and the flat monitor in the upper portion of such briefcase. Consequently, the laptop is usually opened with the top propped or held upwardly at an angle when in operating position. The base or lower portion is usually heavier than the top portion so that having the top pivoted up and backwardly does not overbalance or overturn the computer. Laptop computers have been designed especially for holding on the lap, as their name signifies, particularly when traveling such as in airplanes, cars, trains and other places where the occupant may have time on their hands and would like to be able to use such time constructively by working on problems, data or even games or the like.

While the laptop computer is literally made for use on the lap, such computers can also be used in other places and, in fact, for those who use them when traveling, it is almost imperative that they also be used in other environments in order that they can be used efficiently when traveling, since efficiency in use, as with any computer, requires that some practice in use of a laptop computer be pursued or obtained. Furthermore, when the user of the laptop returns home, he or she will often feel more comfortable continuing a given problem or job on the laptop, rather than attempting to transfer such job to a stationary computer. Of course, an even further consideration may be that the user prefers only to have one computer and that this be a laptop in order to enable it to be used in environments where a standard computer might not otherwise be readily usable. In other cases the user may actually not be able to afford to have alternative computers and therefore will wish to use the laptop at home and/or in the office.

In view of the above considerations, it is the widespread custom to use a laptop computer not only when traveling with such computer resting upon the knees or in the lap of the user, but also to open up such laptop in the office and use it on the desk or on a secretary, i.e. a folding front-type desk, in a home environment, or even frequently, on a kitchen or dining room table at home. However, since a laptop computer is constructed essentially for use while held upon ones lap, the size and arrangement of the computer, while facilitating use conveniently on the lap, is somewhat less convenient and, indeed, cumbersome on a flat surface such as a desk or tabletop. In the first place, the normal height of the usual tabletop, particularly in the United States, is not the best height for use of a keyboard either on a typewriter or a computer. Secondly, the angle of the top of the laptop is designed basically so that the monitor may be easily seen when the computer is used on the knees or in the lap. However, when such laptop is opened up and placed on a flat surface such as a table in front of an operator and the operator sits on the normal chair, such computer is supported at an elevation and position with respect to the operator considerably above the use position for which it is designed. In such position there tends to be glare and reflections from the monitor which can be quite distracting. In addition, the keyboard of a laptop is not usually inclined at a convenient angle for working on the normal height desk or table. Furthermore, just as when using a larger computer, it is frequently desirable to pivot the keyboard from one position to another as one moves at the desk, for example, when receiving a telephone call or the like. All these movements and the like are simply not conveniently made with a laptop computer when it is placed upon a flat surface of the usual height.

While there have been laptop workstations designed, for example, as shown in U.S. Pat. No. 4,852,498 issued Aug. 1, 1989 to T. W. Judd providing for a laptop computer workstation for use on the lap, there have not, so far as the present inventor is aware, been any convenient desktop or table top workstations for use with a laptop computer.

Furthermore, while, as indicated above and also as shown in some of the patents listed below, there have been workstations for ordinary computers which have pivoting features, there has not been any arrangement whereby a laptop computer can be easily used on a flat surface such as a desk or a table and still attain pivotability of the computer to make the use of such computer more convenient. Some of the existing workstations for computers, in addition to the laptop-type workstation disclosed in the Judd patent cited above, are shown in the following patents.

U.S. Pat. No. 4,637,322 issued Jan. 20, 1987 to J. F. Hampshire et al. discloses an adjustable computer worktable for full-sized computers in which both the portion of the table adapted for support of the monitor and a portion adaptable for support of the keyboard can be raised and lowered and also tilted for easier accessibility to the operator.

U.S. Pat. No. 5,041,770 issued Aug. 20, 1991 to M. A. Seller et al. discloses a power-driven computer workstation in which a support for the monitor may be raised and lowered and the support for the keyboard may also be set at various angles to provide better accessibility to the operator.

U.S. Pat. No. 5,161,760 issued Nov. 10, 1992 to W. H. Terbrack discloses a movable keyboard and arm support device in which a base may support a keyboard at an angle.

U.S. Pat. No. 5,174,223 issued Dec. 29, 1992 to M. K. Nagy et al. discloses a so-called ergonomically designed computer workstation adjustable to various positions in which, in particular, the keyboard is angled to provide better access to the operator.

In addition to the above, U.S. Pat. No. 5,120,117 issued Jun. 9, 1992 to C. L. Williams discloses a computer support platform for use at a workstation meant to be mounted upon a conventional height table or desk by cutting out a section of the work surface. The use of the support of the Williams invention, in effect, lowers the work surface so that the keyboard can be placed at a lower and more convenient position for the operator. The Williams workstation also allows the monitor to be placed at an angle and lower than is possible at a normal workstation for the convenience of the operator.

While the work surface for the keyboard of the Williams computer workstation is not angled, the keyboard itself may be angled as shown in FIG. 4 and, in fact, it may be stated in general that most keyboards are themselves angled in order to place the keyboard in a more accessible orientation to the operator. This was also true in the keyboards of many typewriters before they were more or less superseded by the widespread adoption of computers.

It has also been the widespread practice to provide a slanted writing top on a desk or the like and this expedient has also been used on laptop-type writing surfaces, see for example U.S. Pat. No. 4,765,583 issued Aug. 23, 1988 to W. C. Tenner which discloses a laptop-type desk for use in an automobile while traveling in which the top of the desk is slanted towards the user.

When a laptop computer is used in a home environment or in an office environment, such laptop computer is usually merely placed upon the flat top of a desk, a table such as a kitchen table or other work surface such as the drop-leaf top of a secretary or the like. Such laptop computer is in such position, however, not at a convenient angle and is also often not conveniently orientated in a direction which would be most convenient to the operator. So far as the present inventor is aware, there have been no practical support arrangements for use of laptop computers upon such surfaces. The present inventor, therefore, has developed an inexpensive, convenient and practical work stand or station for support of a laptop computer upon a flat working surface which computer stand both supports the laptop computer at a more convenient working angle and also is adjustable circumferentially so that the orientation of the laptop upon the top of the flat surface may be conveniently altered substantially instantaneously.

OBJECTS OF THE INVENTION

It is an object of the present invention, therefore, to provide a support stand for use on normal household or office work surfaces to conveniently support a laptop computer in a comfortable position for operating upon such computer.

It is a still further object of the invention to provide a laptop computer work stand for use in both office and home environments which slants the laptop computer at a convenient working angle that also prevents glare from appearing upon the monitor.

It is a still further object of the invention to provide a laptop computer stand to adapt such computer for use in an office or home environment on a normal work surface, the top of which computer stand is rotatable with respect to the bottom so that the orientation of the laptop computer upon the work surface may be easily altered as the working position of the operator may change.

It is a still further object of the invention to provide a laptop computer stand which may be turned easily to allow the orientation of the computer to be changed as the operating conditions or the operator may change and also to allow the computer to be easily plugged into a power receptacle.

It is a still further object of the invention to provide a laptop computer stand for use on a flat top surface which not only supports the laptop computer at a convenient angle for working and for visual observation of the monitor, but which also will turn upon the exertion of sufficient force to turn the top, but insufficient force to turn the bottom of the stand as it rests upon the work surface.

It is a still further object of the invention to provide for a laptop computer stand for use on a horizontal work surface in which the top of the stand is enabled to turn with respect to the lower portion of the stand while still maintaining support of a laptop computer by having a broad based interengagement between the top and bottom sections of the stand.

It is a still further object of the invention to provide a stand for a laptop computer in which the top and the bottom sections are rotatably interengaged by a central support member in the form of a substantially circular opening or depression into which a circular extension passes with the support between the two sections of the stand being through the end surface of the extension, such end surface of the extension having sufficient surface area to provide a stable base and providing interengagement with the bottom of the depression such that force upon the top of the stand may turn such top with respect to the bottom while the bottom remains stationary upon the work surface, but the top of the stand will not turn as a result of the normal force exerted during typing or other use of the keyboard.

It is a still further object of the invention to provide a work surface stand for a computer which is provided with receptacles along the sides for the retention of computer disks, writing utensils, note pads and the like.

It is a still further object of the invention to provide a support for a computer-type workstation in which the workstation is provided with receptacles along the sides for disks and other supplies which receptacles may or may not be dismountable from the base itself.

Other objects and advantages of the invention will become evident from study of the following explanation and description in conjunction with the appended drawings.

BRIEF DESCRIPTION OF THE INVENTION

The present invention comprises a stand for use in supporting a laptop computer on a horizontal work surface such as a normal desk or tabletop used in the home or at work in the normal office environment. The work stand is comprised of a bottom section forming a base and a top section incorporating a slanted support surface so that when a laptop computer is placed upon such top, such laptop computer is held at a convenient working angle with respect both to the application of the operator's fingers to the keyboard and with respect to viewing a monitor usually provided in the underside of the open top of such laptop. The angle of the support surface of the stand should be such that the monitor face in the top does not tend to be obscured by glare. The overall support surface of the stand is calculated to be substantially the same size or slightly larger than the average dimensions of laptop computers.

The top section and bottom section of the stand are interengaged with each other through the agency of a substantial extension from either the top or the bottom section into a depression upon the other section, the relative dimensions of the extension from and the depression in the two sections of the stand being such that the two sections of the stand are held slightly apart with all the weight of the laptop computer as well as the upper portion of the stand itself supported upon the interengaging element which is in the form of a circumferential support surface upon the end of the extension. The diameter of the extension is such that the upper section of the stand will support the laptop computer in a stable position at all relative rotational positions between the top and the bottom sections ranging from completely aligned with each other to completely unaligned. There should be sufficient interengagement between the end of the extension and the bottom of the receiving indentation such that the top of the stand may be turned together with the laptop computer supported upon the top with the application of a force which is insufficient to cause the bottom portion of the stand to turn upon the work surface, but which force is greater than the force which will normally be exerted upon the stand through the laptop computer by normal operation of such laptop, i.e. by typing upon the keyboard of the laptop computer. Various manners of obtaining the correct interengagement of the top and bottom of the stands may be effected, including a large interengagement surface between the two or a series of smaller interengagement surfaces still maintaining a broad base interengagement between the two sections in order to maintain stability between such sections. The top of the stand is arranged to be turned at least approximately one quarter turn with respect to the bottom so that access to the back of the laptop computer while resting upon the stand may be had to connect and interconnect such laptop computer with a power source when it is being used in an office or home environment.

BRIEF DESCRIPTION OF THE DRAWINGS

FIG. 7 is an isometric view of the bottom section of the stand of the invention showing a supporting extension from the bottom section for receipt into a depression in the top section as shown for example in FIG. 2.

FIG. 8 is an isometric view of an alternative bottom section for the computer stand of the invention in which the lower section of the stand has lesser dimensions than the upper section and also includes the use of an elevated support ring.

FIG. 9 is an isometric view of a still further alternative lower section of the computer stand of the invention in which the lower portion of the stand has both lesser dimensions and a .different shape from that of the upper portion.

FIG. 10 is an isometric view of the stand of a further lower section of the computer stand of the invention in which the lower section has both a different shape and different dimension compared to the upper section as well as a different top surface from that of the embodiment of FIG. 9.

FIG. 11 is an isometric view of a lower section of a stand in accordance with the invention similar to the lower section shown in FIG. 7, but including a in the top rather than an extension as used, for examples, in the embodiment shown in FIG. 4.

FIG. 12 is a front elevation of a laptop computer stand in accordance with the invention wherein the stand has a bottom section similar to that shown in FIG. 9.

FIG. 13 is an isometric view of an embodiment of the invention having a bottom section such as shown in FIG. 8.

FIG. 14 an isometric view of an embodiment of the invention in which the bottom section is similar to that shown in FIGS. 9 and 12.

FIGS. 16 and 17 show respectively an embodiment of the invention including a top section in which the trays on the side are disconnectable from the upper section of the lap top computer stand, the principal section of the top with one tray attached being shown in FIG. 15 and the other tray with connecting hook-type attachment shown in FIG. 16.

FIG. 18 is an isometric view of an alternative embodiment of the lap top computer stand of the invention in which the side trays rather than having their tops inclined at the same angle as the top of the stand, have the front sections of such trays at a uniform height.

DESCRIPTION OF THE PREFERRED EMBODIMENTS

Figure 1:
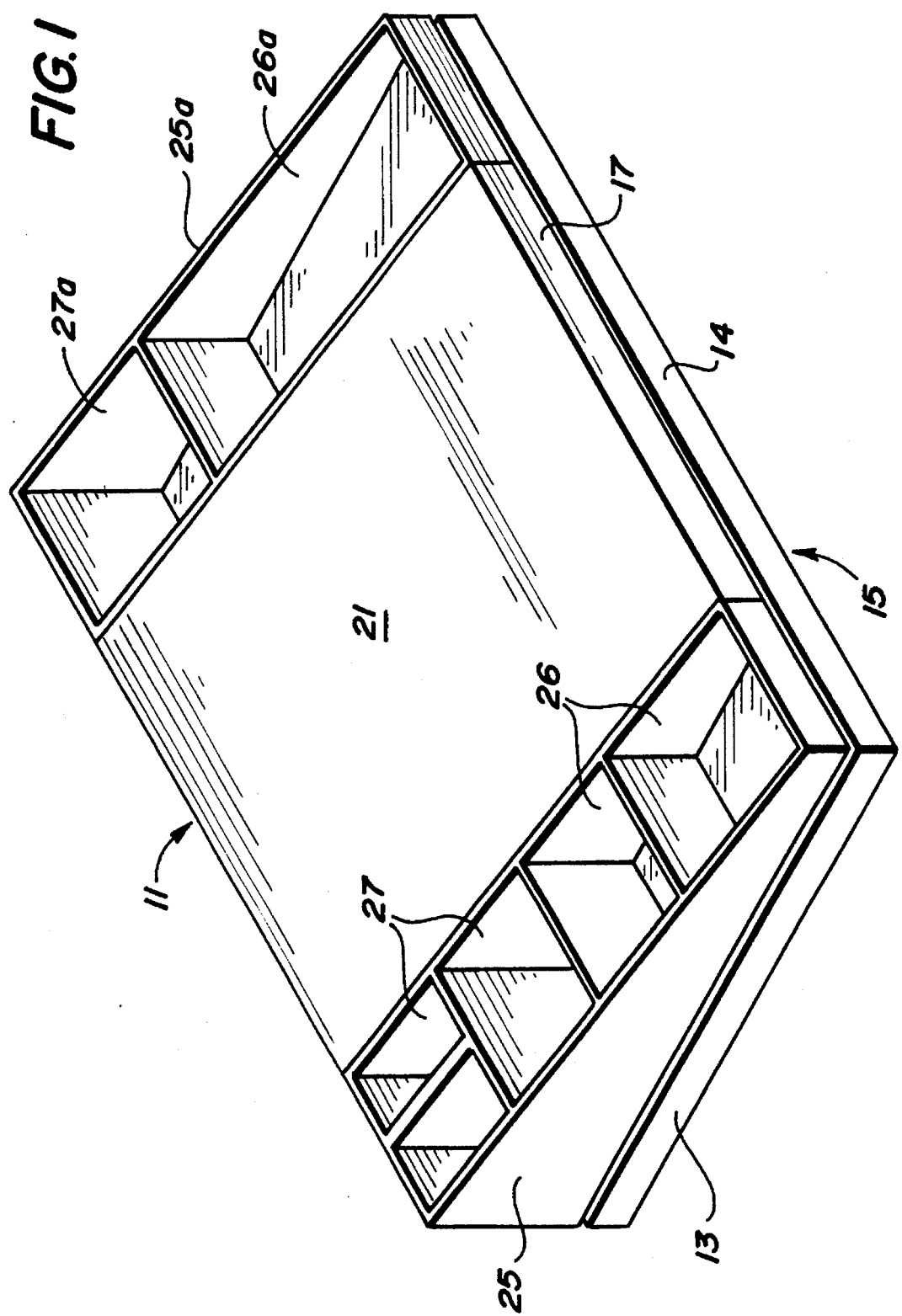
FIG. 1 is an isometric view of the laptop computer work stand of the invention.

Laptop computers are made particularly for use in travel situations where the owner wishes to take a computer with him or her either for use during actual travel or while at an away from home destination. Such computers are small, compact, portable and usually battery operated, at least in part, and primarily designed for use in places which may not have a normal complement of computers or while traveling in airplanes, cars, trains and the like where the occupants may spend a large amount of time seated with nothing much to do other than look out the window, if indeed a window is available. Such laptop computers are usually made in the form of a small briefcase like casing which may be opened revealing a keyboard in the bottom portion which also contains the processing unit and a monitor in the underside of the top portion which visually reproduces the material typed on the keyboard in the lower portion.

Laptop computers have become quite popular and as may be expected, the owners frequently also use them in their primary offices as well as at home. Indeed, as indicated above, a certain amount of "main base" use is necessary in order to become sufficiently acquainted with the computer to efficiently to use it in other places. Also as noted above, the owner of a computer will frequently prefer to invest in a high quality laptop or traveling computer which can be used not only during traveling, but in other places also, rather than investing in two lesser quality computers for use alternatively in traveling and in home base operations.

A laptop computer, however, having been designed for use in a laptop environment, has certain disadvantage for use in a normal working or home base environment in which the working surfaces available are usually in the form of either desks or tables with a standard flat surface and at a fairly standard height, neither of which may be particularly efficient for use of a laptop computer or for that matter, any computer. Nevertheless, there have been few, if any, adaptive stands or the like for increasing the efficiency of the use of a laptop computer when used in a home-based environment on a flat working surface. The present inventor has, however, now developed such a stand which is both practical, economical, efficient and easy to use. Such stand comprises essentially an upper and a lower section, the two sections being rotationally interconnected in a very simple manner which allows the top section to be easily rotated with respect to the bottom section when the top section is supporting a laptop computer and which holds such laptop computer at an effective inclination or angle for most efficient operation upon on a standard height flat working surface. Preferably the computer stand of the invention will be made from a plastic composition such as polyethylene, polypropylene, polycarbonate or other so-called engineering plastic which is strong and smooth as well as economical both in initial price and for fabrication into effective structures. The plastic should also obviously be strong and durable so that it may resist the shocks of having the laptop, which is sometimes fairly heavy, deposited upon it and possibly moved upon it by sliding over the work surface. The plastic should also be wear resistant, since it will be subject to a fair amount of scuffing and the like. Preferably, the stand also includes trays arranged along the sides for the receipt of writing and computing accessories as well as other implements which are likely to be used along with the computer including small stationery and supplies, such as note pads, pencils and pens and, of course, computer disks for use in the computer itself. If desired, the stand itself may be provided with power in order to increase the convenience and efficiency of powering the laptop computer to save its batteries, or alternatively to recharge its batteries, while it is being used at home base rather than in a traveling situation.

In FIG. 1, there is shown an isometric view of a laptop workstation stand 11 in accordance with the present invention. In FIG. 1, there can be seen the peripheral side 13 and front 14 of a bottom section 15 of the workstation stand 11. A top section 17 is shown superimposed upon the bottom section 15 and having a slanted or inclined upper surface 21. Such slanted or inclined upper surface will have an inclination usually of approximately 15 to 35 degrees or, more preferably, 20 to 30 degrees, which provides a convenient angle for operation of the computer keyboard, when the laptop computer is placed upon the normal desk or worktable having a height, in the United States, of about twenty-nine inches. The arms of the operator are usually extended more or less straight from the elbows along the surface, or even somewhat upwardly inclined when using such work surface. Inclining the keyboard upon the work stand of the invention significantly aids the comfort of operating upon such keyboard. Very desirable dimensions of the stand may be one-half inch high in the front, one-and-one-half inches high in the back and with a slanted top laptop support surface of about 9 inches from front to back and about 11 inches from side to side, not including the trays at the side. The slanted top of the stand should not usually be much less than these dimensions, although it can be larger in area. Too large an area, however, makes the stand unwieldy and inconvenient.

At both ends of the upper section 17 of the laptop workstation stand 11 are preferably a series of trays 25 and 25a which are either secured to or integral with the top section. Preferably, such trays 25 are of two types, as shown in FIG. 1, where there are several lower trays 26 on the left side in which relatively small objects like paper clips, erasers, and particularly in the second tray, computer disks may be stored. At the end or rear of the tray sections or series 25 and 25a, there are higher trays 27 and 27a and lower trays 26 and 26a particularly adapted for containing pens, pencils and the like. The upper surface 21 of the work stand may be slightly roughened so that the laptop computer will not tend to slide down its inclined surface.

Figure 2:
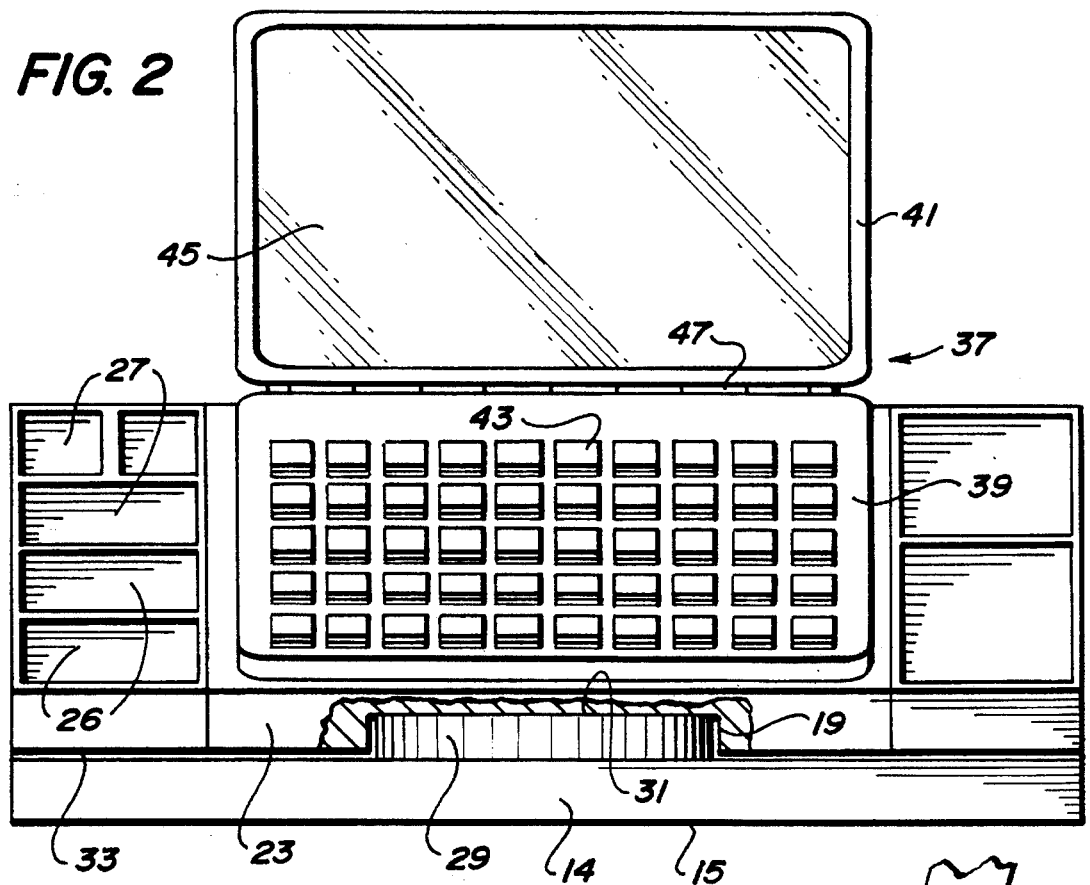
FIG. 2 is a partially broken away front elevational view of the laptop computer stand of the invention shown with a typical laptop computer placed upon it in operating position with the top of the laptop open to reveal the monitor in the top and the keyboard in the bottom, the broken away portion of the drawing showing a supporting extension from the lower section projecting into a depression or opening on the bottom of the upper section of the computer stand.

FIG. 2 is a front elevation partially broken away of the laptop workstation stand 11 shown in FIG. 1 showing the peripheral front side 14 of the bottom section 15 of the laptop workstation stand 11. A front peripheral side 23 of a short portion of the upper section 17 of the stand 11 is broken away in FIG. 2 to reveal extension 29 extending upwardly into a depression or opening 19 in the top section 17. See also FIG. 7 which shows the top of the lower section 15.

The surface area of the top 31 of the extension 29 is arranged to provide an amount of friction between such top and the upper surface of the depression 19 in the bottom of the upper section sufficient to prevent the two sections when the weight of the laptop computer is imposed upon the upper section from turning or moving with respect to each other either under the influence of vibration or under the influence of normal typing or use of the keyboard, but insufficient friction to prevent the top section from turning with respect to the bottom section. The bottom section preferably has friction-type surface pads, not shown, on its bottom made, for example, of a rubber composition or the like to securely grip any work surface such as the top of a desk or worktable upon which it is set and to prevent it from sliding easily over the surface. Other equivalent friction arrangements can be used. A small opening 33 between the top 17 and the bottom 15 can be seen in FIG. 2. Also shown are the front walls of the lower trays 26 and the forward and back sections of the higher trays 27. Several writing implements 35 are shown extending from the upper portion of one of the upper trays 27 in FIG. 3, which is a side view of the arrangement shown in FIG. 2. Tray 27a on the right side of the stand is shown not divided into two sections as are the trays on the left.

Reclining upon the slanted surface 21 of the upper section 17 of the stand 11 is a laptop computer 37 having a bottom section 39 and a top section 41. The bottom of the laptop computer 39 has a keyboard 43 and the top section 41 contains a monitor screen 45. As may be seen, the two sections, i.e. top 41 and bottom 39, are connected by the usual hinge arrangement 47.

Figure 3:
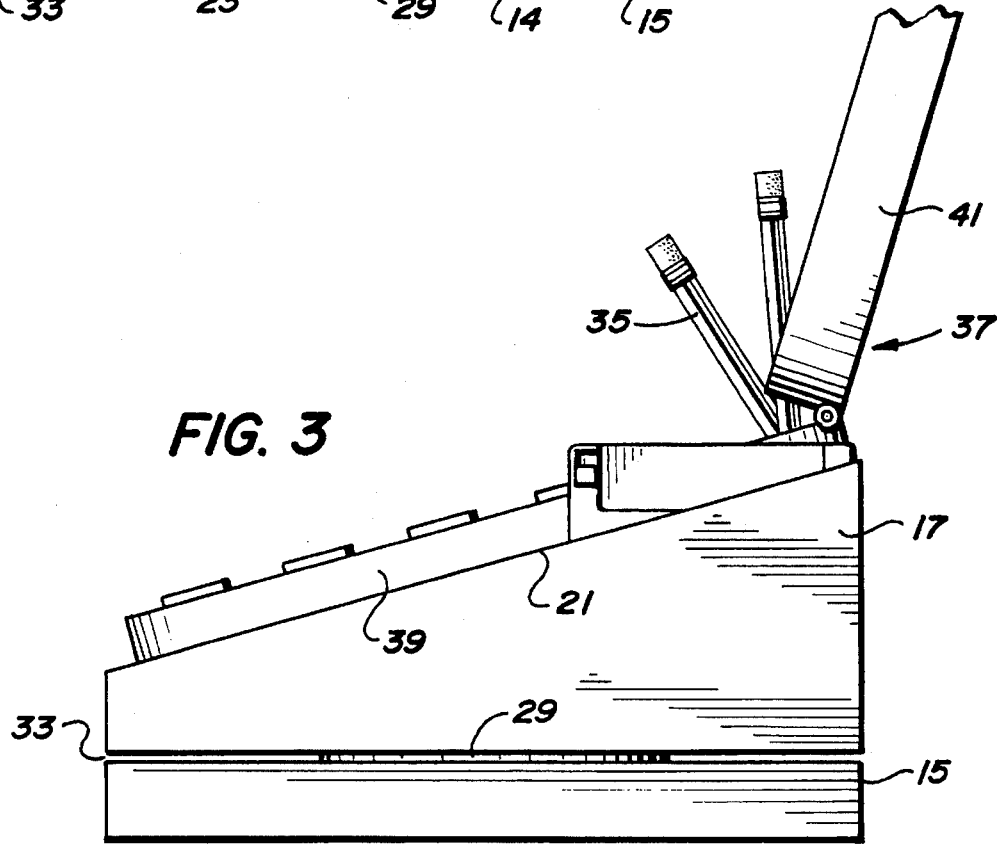
FIG. 3 is a side elevation of the stand and laptop arrangement shown in FIG. 2.

FIG. 3, as noted above, is a side elevation of the laptop workstation stand 11 showing the laptop computer 37 resting upon the slanted surface 21 of the upper section 17 of the workstation. It will be noted that the angle of the laptop computer is such that as it rests upon the slanted upper surface of the stand, the lap top is supported at a convenient angle for working on the keyboard 43 and for viewing the monitor screen 45. At the same time, the upper section of the lap top is at an angle or inclination which will not tend to make the top fall into a closed position.

Figure 4:
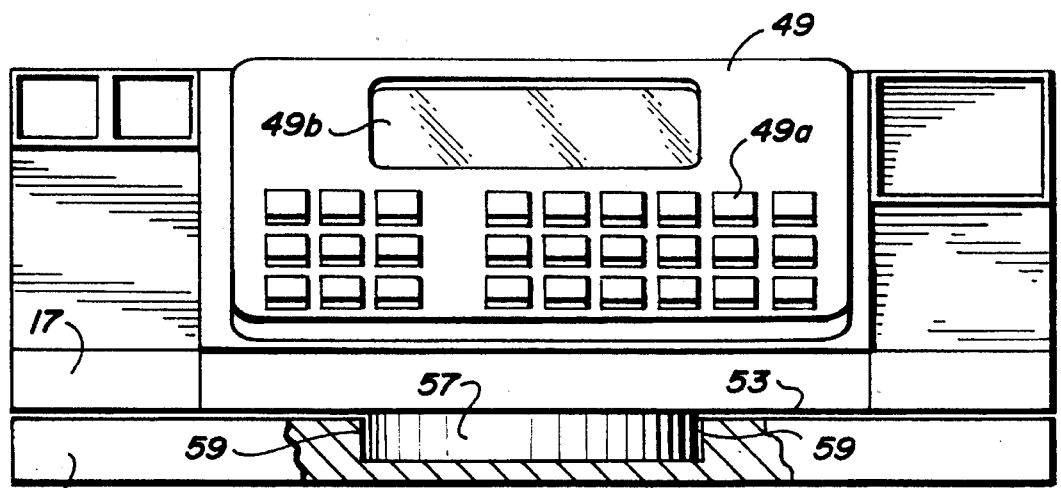
FIG. 4 is a partially broken away front elevation of the stand of the invention with a specialized laptop computer or other small computer having a restricted area monitor arranged in the same section of the computer as the keyboard so that the laptop computer does not actually open, but has its top exposed at all times, the broken away portion showing a supporting extension projecting from the top section into a receiving depression or opening in the bottom section.
Figure 5:
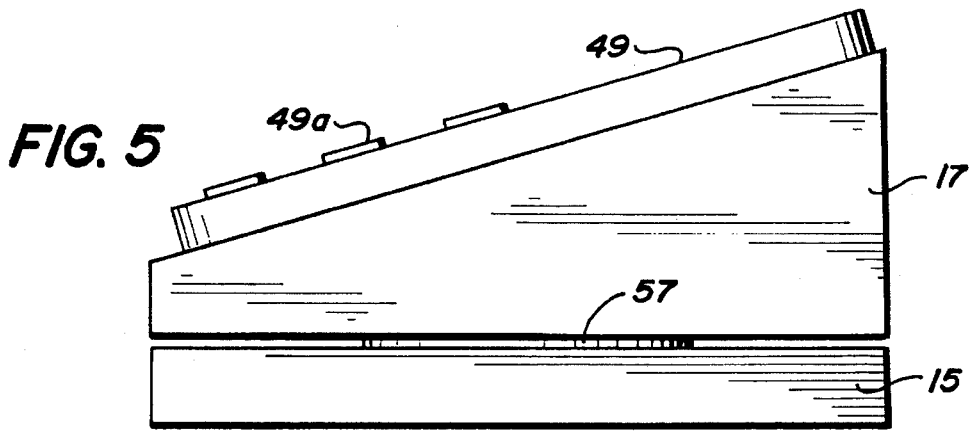
FIG. 5 is a side elevation of the arrangement shown in FIG. 4.

FIGS. 4 and 5 show respectively a front elevation and a side elevation of the laptop workstation stand as shown in FIGS. 2 and 3, but supporting a specialized computer somewhat in the form of a calculator or the like in which a small monitor screen is provided in the base of the computer itself and there is no folding top to such computer. FIGS. 4 and 5 show the versatility of the stand arrangement of the invention which may be used not only for conventional laptop computers, but for other types of computers or calculators or the like.

The same reference numerals are used in FIGS. 4 and 5 as in FIGS. 2 and 3 to indicate similar structures. The specialized computer is designated as 49 and has a keyboard 49a and a monitor or screen 49b. A slightly different interengagement between the top section 17 and lower section 15 of the stand 11 is shown in FIG. 4. In such interengagement, bottom surface 53 of the upper section 17 of the computer stand has an extension 57 which matches with a depression 59 in the bottom section 15 as shown partially broken away in FIG. 4. A similar bottom section 15 with the depression 59 is also shown in FIG. 11. It will be recognized that the interengagement arrangement shown in FIGS. 4 and 11 is basically the exact opposite of the arrangement shown in FIGS. 2 and 7 in which the depression is in the top section and the extension 29 extends upwardly from the bottom section. For ease of manufacture by molding, it is usually preferred to have the extension 29 on the bottom section as shown in FIGS. 2 and 7. However, from an operational standpoint, the two arrangements are essentially equivalent.

Figure 6:
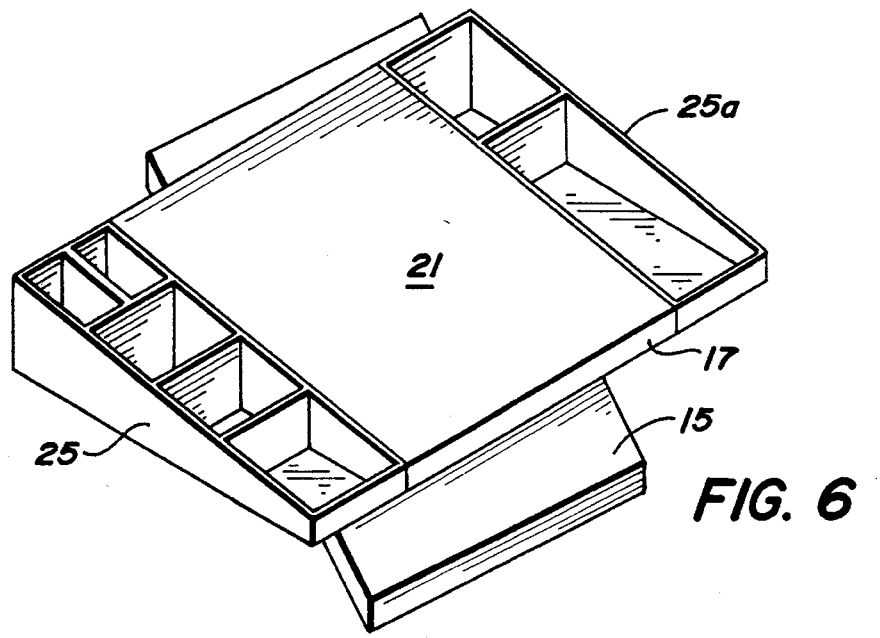
FIG. 6 is an isometric view of the lap top computer stand of the invention as shown in FIG. 1 to 5 with the top section of the stand turned with respect to the bottom.

FIG. 6 shows an isometric view from above of an embodiment of the invention similar to that shown in FIGS. 1 and 2 where the upper section has been turned almost at right angles with respect to the lower section in order to gain better access to the computer keyboard or connect electrical outlets to the back or the like. In other words, FIG. 6 illustrates a rotated arrangement of the invention.

As indicated earlier, FIG. 7 is an isometric view from above of the lower section 15 of the laptop computer stand showing the extension 29 extending upwardly from the top surface 30. As will be understood, the upward extension 29, which has overall substantially uniform dimensions, i.e. in the case shown, a uniform diameter, will have a height which is slightly greater than the depth of the opposing depression in the lower surface 53 of the top section 17 so that the two sections are held apart with a clearance of that amount. See, for example, FIG. 2. The upward height of the extension 29 is slightly greater than the depth of the corresponding depression in the upper section 17 so that there is no substantial contact between the flat upper surface 30 of the bottom section 15 and a corresponding flat lower surface of the top 17 of the laptop workstation stand 11. If the extension 29 is 1½ inches in height, the depth of the corresponding depression on the bottom of the upper section 17 may be 1⅜ inches in depth. This provides clearance between the two flat surfaces so that there is no substantial friction between them.

FIG. 8 is an isometric view from above similar to FIG. 7, but in which the dimensions of the bottom, except for the extension 29, are less in the longitudinal direction. The use of such a base, or bottom, with the top 17 is shown in FIG. 13 described below. A further raised ring 32, referred to here as a support, support extension or additional support extension is shown in FIG. 8 extending upwardly from the top of the extension 29. Such ring or variations thereof may be used to alter the amount of interengaging contact between the two sections to vary or adjust the amount of force necessary to turn the two sections.

FIG. 9 is an isometric view from above, similar again to FIGS. 7 and 8, but showing a substantially round base or lower section 63 having essentially beveled edges. The central extension is shown somewhat smaller than in FIGS. 7 and 8, but may or may not be, in fact. The flat top portion 65 of the lower section of the arrangement shown in FIG. 9 may be the weight-bearing portion of the base bearing upon a similar portion of the bottom of the top section and the extension 29 may merely stabilize the top section 17 shown in previous figures in a longitudinal and lateral or transverse direction. However, the top of the extension 29 may also serve as a weight-bearing and friction surface 67 as in other embodiments, depending upon the length of the extension and the depth of the depression.

FIG. 10 is an isometric view from above similar to FIG. 9 showing a further variation of a round base, namely one in which the base 63 is itself purely round or circular and the top, other than for the protruding extension 29, is substantially flat. In this embodiment, the top of the extension 29 will usually constitute the primary weight-bearing or friction surface, 67 but again, the surface 65 could alternatively be the weight-bearing surface. However, as shown in FIG. 10, this surface would be too large in area to provide an efficient slippage surface.

FIG. 11 is an isometric view from above of a still further variation of a base 15 similar in shape to the base in FIG. 7, but in place of having an extension accommodated in a depression on the bottom of upper section 17 as shown in FIGS. 2 and 7, incorporating instead with a depression 59 to accommodate an extension 57 on the bottom of the upper section 17 as shown in FIG. 4.

Figure 15:
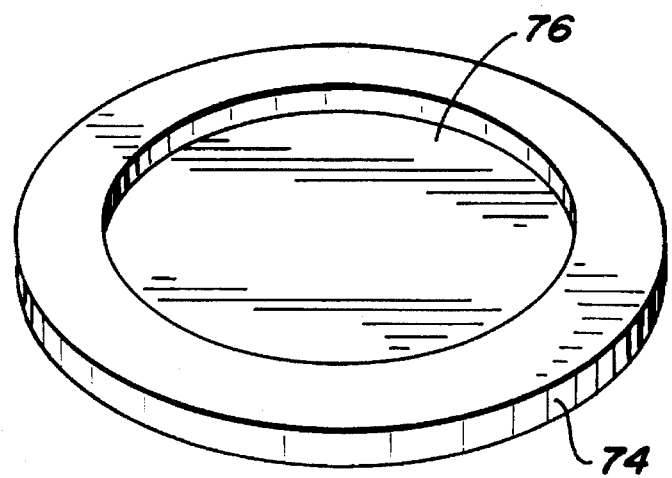
FIG. 15 is an isometric view from above of a base or lower section incorporating a frustoconical shape or frustum having a depression in the top for the receipt of an interengaging extension from the top section of the stand.

As indicated above, FIG. 9 shows an alternative and somewhat more sophisticated design of the lower portion 15 of the laptop computer work stand 11 in which such lower portion has beveled sides and takes an essentially frusto conical configuration having an upward extension out of the top of the frustum. The frusto conical section 63 has a flat top section 65 with an extension 29 extending upwardly therefrom intended, as will be understood, to fit into a depression on the bottom of the top section of the stand. The arrangement is further shown in FIGS. 12 and 14 which are respectively, a front elevation of an embodiment of the invention incorporating a frusto conical shape in the lower section of the stand, and an isometric view from above showing an upper section 69 fitting over a lower frusto conical section 63. The upper section 69 has a conforming shape on the bottom to accommodate the frusto conical configuration of the bottom section or base. The lower portion of the top extends downwardly on the sides of the workstation of the frusto conical section 63. As in the previous embodiments, the extension 67 extends into a depression, not shown, in the bottom of the top section 69. It will be understood that the arrangement shown in FIG. 12 will have a superior stability as the upper section is turned upon the lower section, since the upper section never extends beyond the lower section, except in the far corners and then only to a relatively minor degree. The gently slanting sides of the frusto conical section also provide a convenient inclined support surface for the wrist or forearm of the operator to rest during operation of the keyboard. It will be noted, for example, that the front portions 71 and 73 respectively of the top 69 and the bottom 63 of the embodiment shown in FIGS. 12 and 14 are lower, thinner or less extensive than in other embodiments and this reduced height plus the slant of the inclined section 73 of the bottom portion of the stand considerably facilitates effective extension of the arm and wrist from the primary work surface, i.e. the desk or table surface, up onto the inclined surfaces of the support stand and onto the keyboard of the laptop computer in an ergonomic, or physically healthful manner. Thus, while the arrangement shown in FIGS. 12 and 14 is slightly more complicated and costly to produce, the efficiency and effectiveness is significantly improved. It will be understood, that while the top section 69 and the bottom section 63 in FIGS. 12 and 14 could be directly interengaged with relatively superior stability and strength, it is preferable for the extension 29 which projects upwardly from the lower section 63 as shown in FIG. 9 to be used. This provides the most preferable interplay of frictional forces to allow the top section to be easily turned by the direct force of the operator's hand, while not being moved by use of the keyboard or by extraneous vibration. Alternatively, a slight step comprised of a portion of the forward surface 65 of the lower section 63 may protrude from under the front of slanted surface 21 of the laptop workstation. However, it will usually be advantageous to have the slanted section 21 of the top section 69 and the frusto conical slanted surface of the bottom or lower section 63 of the laptop workstation come more or substantially together or substantially abut, as shown in FIG. 14. In a preferred arrangement, the angle of the frusto conical section 63 may be essentially the same as the angle of the slanted portion or top 21 of the workstation. In this arrangement, a single angle extends upwardly for the forearm and wrist and is continued into the slanted top of the workstation which slanted top 21 actually supports the laptop computer on a flat work surface in an office environment or residential environment. In the arrangement shown in FIG. 14, it may be advantageous for the extension, not shown, which rotatably interconnects the top and bottom sections, to project from the top section 69 of the workstation into a depression, not shown, in the lower portion of the workstation in the center of the frusto conical support surface. This is because when the frusto conical section has an extension projecting upwardly into a depression in the bottom surface of the laptop computer supporting section, there may remain only a restricted amount of clearance or room between the bottom of the upper section and the slanted computer supporting surface 21 in which a depression of adequate dimensions could be formed to receive an extension extending upwardly from the bottom section. A lower rounded section 74, but not a frusto conical or frustum section, having such a depression 76, is shown in FIG. 15.

FIG. 13 shows an alternative embodiment of the invention in which the lower section of the computer stand 11, such lower section being designated by the reference numeral of 61, is abbreviated in size so that a limited portion of the upper section 17 and as well as the trays 25 and 25a extend, in general, completely beyond the lower section. Such arrangement is not quite as stable as the arrangement shown in the earlier figures, but is still sufficiently stable for most purposes, since the upper section may extend beyond the lower section, in any event, when the upper section has been turned slightly with respect to the lower section.

In FIG. 16, a top section designated as 77 without the accompanying bottom section is shown with one tray removed. Two openings or orifices 79 are provided in the side of the slanted section 77 for receipt of two mounting hooks 81 provided on the side of a tray shown in FIG. 17 described below. It will be understood that the tray 85 or the opposite side of the stand portion 77 will also normally be detachable as a separate piece from the slanted top section 77 of the stand. In other words, if one tray is made detachable, normally the tray on the opposite side will also be made detachable, while, if one tray is made integral with the upper section of the laptop computer stand of the invention, normally both trays will be.

In FIG. 17 there is shown a tray assembly 83 which has clips 81 extending from one side. These clips 81 are arranged to extend into the orifices or openings 79 on or in the sides of the upper section of the workstation stand of the invention in order to hold the trays in a convenient position for the use in operation of the computer. As indicated above, FIG. 16 shows the side of the upper section of the computer stand with the orifices 79 provided in it. As will be understood from the above description, the trays may also be formed as an integral portion of the upper section of the workstation.

While one tray arrangement in which there is a lower section with one or several separate compartments and an upper section also with one or several separate compartments has been shown and described above, it will be understood that other tray arrangements may also be used. For example, a tray having several levels of compartments or stepped compartments from the front of the workstation to the rear can also be used. Such a tray arrangement is shown in FIG. 18 where it will be seen that the lower trays 89 incorporate a flat even upper surface, while the higher trays 91 retain the upward slanted surface corresponding to the slanted top of the computer supporting surface 21 as shown in the other drawings. It is usually desirable not to extend the trays above the slanted computer supporting surface in order not to interfere with the laptop computer on top. However, since the width of the slanted portion will usually be designed to accommodate any computer of the laptop-form (or at least the more modern smaller versions) the trays can usually be made any height one wishes. It will be understood that the upward extension of the higher tray should normally be positioned near the back of the arrangement so that such higher section is out of the way of the user of the stand. Normally, any such higher section will extend upwardly beside the open upward section of the laptop computer and therefore defines the sides of the available clearance for the top of the computer.

Figure 19:
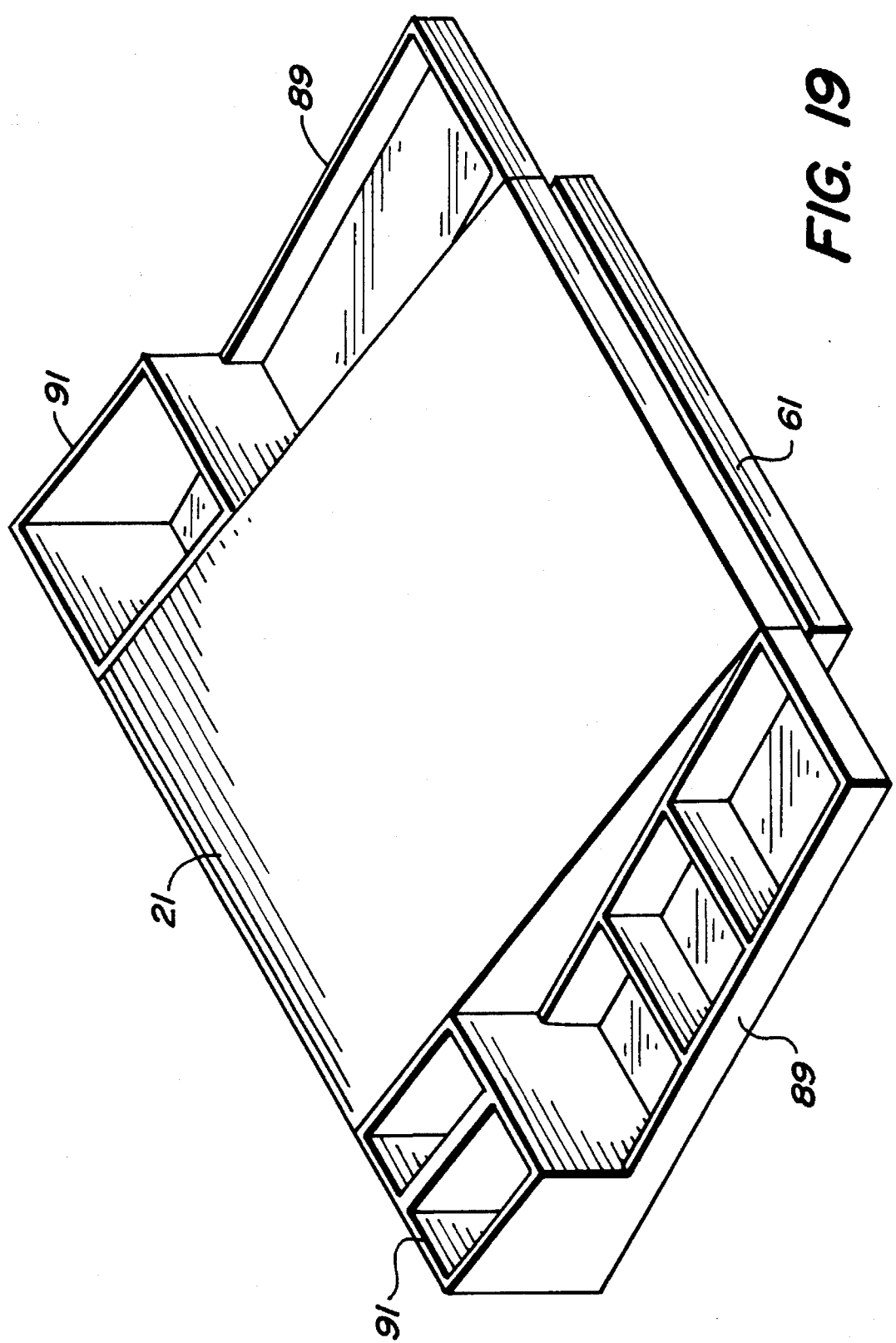
FIG. 19 is an isometric view of an alternative embodiment of the laptop computer stand of the invention in which the lower portion of the stand is smaller than the upper portion and the front portions of the side trays are at a uniform height.

FIG. 19 is an isometric view of a further embodiment of the invention in which bi-level trays 89 and 91 are used as in FIG. 18, but in which there is a restricted length base or lower section.

Figure 20:
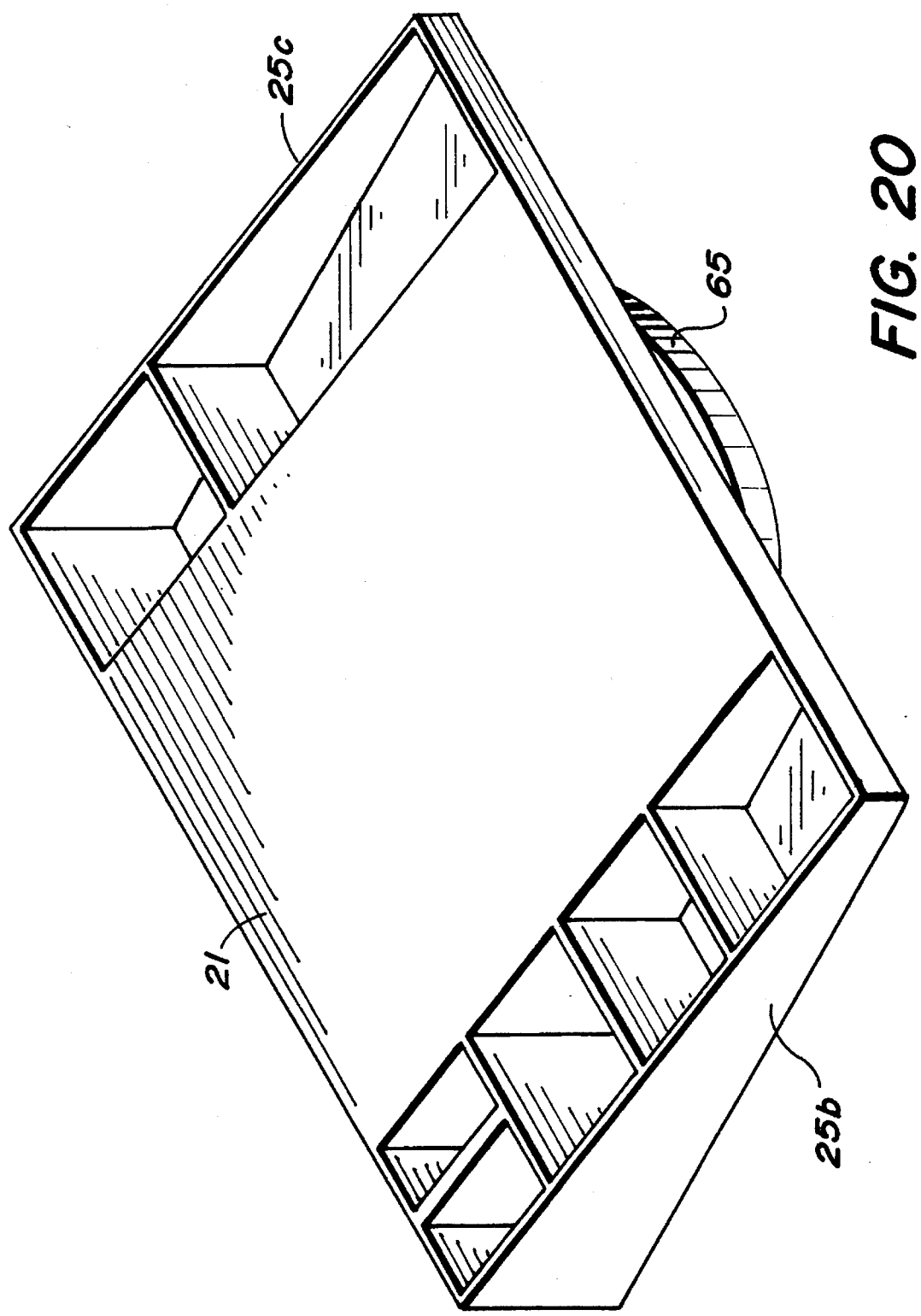
FIG. 20 is an isometric view of an alternative embodiment of the laptop stand of the invention in which the lower portion or base of the stand is round as shown in FIGS. 10 or 15.

FIG. 20 is an isometric view of a further embodiment of the invention in which a round lower portion or pedestal is used.

Figure 21:
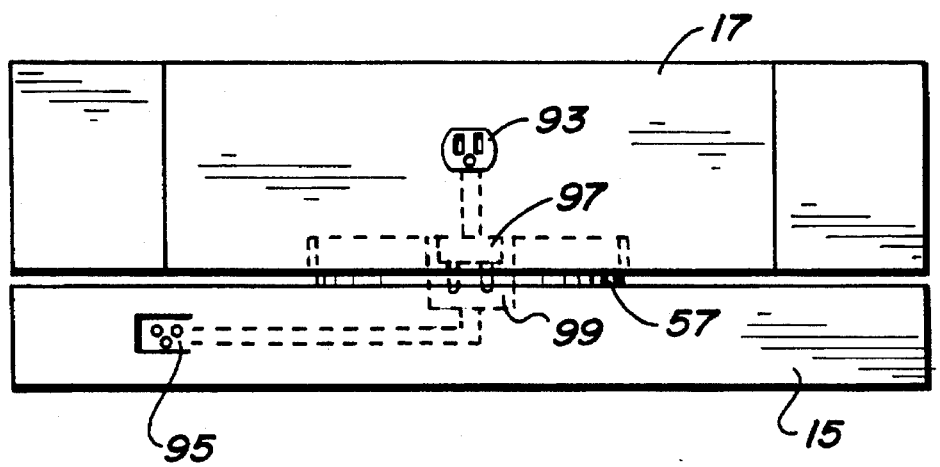
FIG. 21 is an elevation of the back of a typical embodiment of the invention showing diagrammatically a power circuit for the stand of the invention to allow a laptop computer to be plugged into the stand rather than directly into a local electrical system.

FIG. 21 shows an elevation of one embodiment of the invention viewed from the rear in which the upper section 17 of the laptop computer workstation stand 11 is provided with an electrical outlet 93 into which a laptop computer may be plugged when used as a stationary computer resting upon the stand. Also in the lower section 15 of the computer stand 11 is a further receptacle 95 for a power wire or cord which conducts power to the work stand. An internal circuit, shown in dotted lines, may carry the electrical current from the power receptacle through appropriate sliding contacts, as generally shown, or merely by a flexible internal power cord. In the case of the use of sliding electrical contact extensions as shown diagrammatically from the upper fitting 97, such extensions or prongs are designed to be dead when the upper and lower sections 17 and 15 of the stand of the invention are separated from each other. This is effected by having the extensions protrude into shielded grooves on the power side fitting 99 in conventional manner. Alternatively, a second external flexible short power cord could be plugged into two communicating power receptacles, not shown, to conduct current from the lower section 15 to the upper section 17 of the laptop computer stand 11. Power could be fed directly into the receptacle 97 of the upper section to be transferred to the outlet 93 providing a permanent power connection to the stand, with a more convenient plug-in receptacle for the computer itself on the stand. However, because of the relative rotation of the two sections of the stand 11 with respect to each other, it will usually be more efficient and convenient to conduct the initial power to the lower section 15 and then to the upper section for powering the computer. It has been found particularly convenient to be able to leave the work stand plugged in at all times and ready for operation of the laptop computer merely by inserting the plug of the computer into such outlet. It will be understood, as indicated above, that the power from the power line may be conducted between the lower section of the workstation stand and the upper section by any convenient sliding contact. Alternatively, the power line may merely enter either the upper section or the lower section eliminating both the requirement for a sliding contact between the two sections as well as any transfer receptacles. In a still further arrangement, the upper and lower sections may be connected by a permanent short flexible wire, not shown, which conducts power from the lower to the upper section and allows sufficient rotational play between the upper and lower sections so that the upper section can be turned sufficiently to be convenient, but not so far as to seriously tension the wire. It will be understood, in any event, that the relative rotational movement between the top of the work stand and the bottom of the work stand need not be particularly great in order to be effective in making the arrangement more convenient than otherwise. The turning of the upper section is used primarily, in any event, to allow the operator to change his or her position slightly with respect to the computer from side to side or when answering a telephone or the like and also to enable the operator to easily plug the computer into the stand or in case there is no plug in the stand, to merely plug a power wire into the back of the computer without having to lift the computer up to see where the plug is. Consequently, the amount of actual turning of the top with respect to the bottom need not be particularly great.

If the power is conducted internally through the laptop computer stand by any internally exposed sliding contacts or the like, it is desirable for the upper section and lower section to be retained together in rotational relationship to avoid the exposure of any such internal contacts. The use of a completely female receptacle arrangement or, alternatively, the system shown in FIG. 21, is particularly desirable from a safety standpoint, since, if shielded plugs are used in the receptacles, no exposure of power leads will occur even with the bottom and top sections dismounted from each other.

As will be understood, having the upper slanted surface 21 of the computer stand 11 within a range of about 15 to 35 degrees of horizontal, as well as having the upper side surface 73 stand at about the same angle in those embodiments where a frustum-type lower section is used, enables the basic computer convenience to be increased by relieving strain upon the wrist and forearms of the operator when using the computer which otherwise might be present. An upward inclination of not only the keyboard, but the face of the stand, provides a natural position of the forearms of the operator when using a laptop computer upon the usual rather high work surface of a conventional desk or worktable such as a kitchen table or the like. The laptop workstation computer stand of the invention, therefore, provides a very effective means to reduce fatigue and strain and increase the convenience of use of a laptop computer so that it may be conveniently used as a stationary computer in a workplace or residential environment. As explained, the turning of the upper section, and therefore the computer itself, is also very convenient in a semipermanent installation for both the comfort and efficiency of the operator.

It will be understood that the extension from either the top or upper section or the bottom or lower section into a depression in the opposing surface, the combined arrangement of which may be conveniently referred to as a rotational engagement means, may be varied within wide but critical limits to provide an amount of frictional engagement that will allow the upper section to be easily moved or rotated by hand movement relative to the lower section without disengaging the frictional engagement of the lower section with the work surface, but will not allow the upper section to rotate with respect to the lower section under the effect of local vibration caused either by locally external vibration or by internally produced vibration such as operation of the keys on the keyboard of the computer during normal operation of each computer. Various adjustments of the friction within the rotational engagement means may be used to attain the correct frictional engagement between the two sections to accomplish these purposes. The principle adjustment will be the amount or area of surface contact between the opposing surfaces in contact between the extension and the depression. The second factor is the composition and relative roughness of the opposing surfaces. The third important factor is the pressure between the two surfaces, which resolves itself into the weight of the upper section of the computer stand plus the weight of the computer itself. The more surface contact there is and the rougher the contacting surfaces, the more friction there will be. Likewise, the more weight or force between the parts measured as unit force per square unit area, the more friction is engendered. The combined weight and surface area relationship is not a linear relationship because the weight per unit surface area will itself vary as either the weight or the contacting surface area is altered. A still further factor to be considered is that the width of the overall contacting surfaces in two dimensions must be maintained correct to maintain stability between the parts. The amount of surface area in contact can be conveniently decreased if the spread of contact must be increased for additional stability by the use of raised bearing surfaces such as the bearing ring 32 on the top surface 31 of the extension 29 shown in FIG. 8. Such bearing ring 32 serves as the actual contact with the end surfaces of the upper portion 17 of the laptop workstation 11.

While the present invention has been described at some length and with some particularity with respect to several described embodiments, it is not intended that it should be limited to any such particulars or embodiments or any particular embodiment, but is to be construed broadly with reference to the appended claims so as to provide the broadest possible interpretation of such claims in view of the prior art and therefore to effectively encompass the intended scope of the invention.

I claim:

1. A work-top surface support stand for a laptop-type computer comprising:

(a) a lower section forming a base adapted for placement and support upon a flat working surface (b) an upper section forming a laptop computer support means adapted for at least partially rotatable engagement with said base, (c) said support means having a substantially flat horizontally disposed bottom surface adapted for rotational movement relative to an adjacent substantially flat horizontally disposed top surface of said base, (d) said base and laptop computer support being rotatably engaged with each other by a rotatable broadbase engagement means allowing relative rotational movement between said base and support means while providing lateral stability to said support means, (e) the top surface of the support means being inclined at an angle of between fifteen to thirty-five degrees with respect to horizontal and being sufficiently extended to underlie substantially an entire under surface of an average laptop computer, and (f) said rotatable engagement means being arranged and constructed to allow relative rotatable movement, when an average weight laptop computer is supported by the support means, between the support means and base through rotation of an extension of one member of said rotatable engagement means within a receiving depression in a second member of said rotatable engagement means upon the application of an off-center force to the support means preferentially to causing the base to slide upon the working surface upon which it is supported, but not to allow relative rotation between the base and the support means under the impetus of environmental or use related vibration or forces applied to the laptop computer or the support means and (g) wherein the relatively rotatable engagement means comprises a projecting extension extending between the base and the support means and received into an extension receiving depression, said projecting extension and extension receiving depression both having a width at least several times their respective height and depth and (h) wherein the height of the projecting extension means is at least slightly different from the depth of the extension receiving depression such that the weight of the support means and any computer thereupon is effectively transferred to the base at points sufficiently laterally spaced to provide lateral stability to the support means at all achievable rotational positions of the support means with the base.

2. A work-top surface support stand for a laptop-type computer in accordance with claim 1 wherein the projecting extension means extends from the base into a configurationally matching receiving depression in a lower surface of the support means.

3. A work-top surface support stand for a laptop-type computer in accordance with claim 1 wherein the projecting extension means extends from a lower portion of the support means into a configurationally matching receiving depression in the base means.

4. A work-top surface support stand for a laptop-type computer in accordance with claim 2 wherein the projecting extension means is sufficiently greater in length than the depth of the receiving depression so that the weight of the support means and any supported laptop computer is essentially supported and stabilized upon the face of the extension and the bottom of the receiving depression, the lateral extent of the face of the extension in contact with a bottom of the receiving depression means being sufficient to laterally stabilize the support means.

5. A work-top surface support stand for a laptop-type computer in accordance with claim 3 wherein the length of the projecting extension means is sufficiently greater than the depth of the receiving depression so that the weight of the support means and any supported laptop computer is essentially supported and stabilized upon the face of the extension and the bottom of the receiving depression, the lateral extent of the extension being sufficient to laterally stabilize the support means.

6. A work-top surface support stand for a laptop-type computer in accordance with claim 2 wherein the length of the projecting extension means is not sufficient to reach the bottom of the receiving depression and the support of the support means is substantially upon alternative engaging surfaces of the base means and support means.

7. A work-top surface support stand for a laptop-type computer in accordance with claim 3 wherein the length of the support extension is not sufficient to reach the bottom of the receiving depression and the support of the support means is substantially upon alternative engaging surfaces of the base means and support means.

8. A work-top surface support stand for a laptop-type computer in accordance with claim 4 wherein at least major portions of the base and support means are formed of a synthetic plastic polymeric material.

9. A work-top surface support stand for a laptop-type computer in accordance with claim 8 additionally comprising trays positioned and supported upon both sides of the inclined top surface of the support means.

10. A work-top surface support stand for a laptop-type computer in accordance with claim 9 wherein a substantial portion of the trays are integral with the support means.

11. work-top surface support stand for a laptop-type computer in accordance with claim 9 wherein the tray means are suspended by attachment means to a side of the support means.

12. A work-top surface support stand for a laptop-type computer in accordance with claim 11 wherein the tray means are sectionally divided to provide separate support and storage for computer-type aids.

13. A work-top surface support stand for a laptop-type computer in accordance with claim 12 wherein top surfaces of front trays of the support stand are lower than an inclined surface of the support means and a top surface of at least one rear tray is higher than a top surface of the front trays in order to adapt said one rear tray for the storage of elongated articles.

14. A work-top surface support stand for a laptop computer in accordance with claim 4 wherein an additional support extension means extends between the extension and a bottom of the receiving depression.

15. A work-top surface support stand for a laptop computer in accordance with claim 1 wherein the top support surface of the support means is between 20 and 30 degrees from horizontal.

16. A work-top surface support stand for a laptop computer in accordance with claim 1 wherein the top support surface of the support means is about 25 degrees plus or minus 3 degrees of from horizontal.

17. A work-top surface support stand for a laptop computer in accordance with claim 1 wherein both the support means and base incorporate interconnecting electrical power circuit means.

* * * * *